United States Patent
Ando

(10) Patent No.: US 6,657,750 B1
(45) Date of Patent: Dec. 2, 2003

(54) COLOR READING APPARATUS AND STORAGE MEDIUM

(75) Inventor: Motonobu Ando, Iwakura (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/255,730

(22) Filed: Feb. 23, 1999

(30) Foreign Application Priority Data

Feb. 26, 1998 (JP) ............................................. 10-045119

(51) Int. Cl.[7] ................................................. H04N 1/04
(52) U.S. Cl. ...................... 358/474; 358/413; 358/437; 358/505
(58) Field of Search ................................. 358/404, 412, 358/413, 437, 474, 505, 514

(56) References Cited

U.S. PATENT DOCUMENTS 5,220,437 A * 6/1993 Saegusa et al. ............. 358/474
5,570,206 A * 10/1996 Yoshinaga .................. 358/474

* cited by examiner

Primary Examiner—Thomas D. Lee
(74) Attorney, Agent, or Firm—Oliff & Berridge, PLC

(57) ABSTRACT

A color reading apparatus in which reflection light from a read-target medium is read on a line-by-line basis for each color of red, green, blue by a monochromatic line image sensor. The color reading apparatus performs a color reading operation while the relative position between the read-target medium and the monochromatic line image sensor is changed by a feeding apparatus. The color reading apparatus includes a feed control device that stops a driving source of the feeding apparatus at the completion time of a one-line color reading operation composed of one-line reading operations for red, green and blue colors when a reading operation for a read-target medium is temporarily interrupted.

15 Claims, 2 Drawing Sheets

COLOR READING APPARATUS AND STORAGE MEDIUM

BACKGROUND OF THE INVENTION

1. Field of Invention

The present invention relates to a color reading apparatus using a monochromatic line image sensor.

2. Description of Related Art

As a color reading apparatus is known that uses a monochromatic line image sensor. In such a color reading apparatus, for example, either each of a plurality of light emission diodes of red, green and blue is turned on for a predetermined time in turn or three color filters of red, green and blue are inserted into an optical path between a white light source and a monochromatic line image sensor for a predetermined time in turn while an original to be optically read out (hereinafter referred to as "read-target original") is fed at a predetermined speed in the direction opposite to the auxiliary scan direction. The reflection light from the read-target original is read (detected) on a line-by-line basis for each color (red, green and blue) by the monochromatic line image sensor.

There may be cases where a reading operation must be temporarily interrupted halfway through a process of reading a sheet of read-target original. For example, when a facsimile transmission or copy is carried out in a facsimile machine or the like, a read-out image signal from the reading apparatus is converted to digital data and subjected to various types of processing. Thereafter, the data thus processed are stored in a buffer memory and then supplied from the buffer memory to a modem or a print apparatus. In this case, if an empty capacity of the buffer memory is reduced, the reading operation must be temporarily interrupted in order to prevent over-flow of the buffer memory.

Therefore, in the case of the conventional color reading apparatus using a monochromatic line image sensor, the empty capacity of the buffer memory is checked for each color (red, green and blue) at the time when the reading operation of one line is finished. When the empty capacity is judged to be less than a predetermined value, a step motor for feeding the read-target original is stopped.

The above described conventional color reading apparatus has a problem that the reading precision is reduced due to the interruption of the reading operation. Thus, a high-quality reproduced image may not be obtained.

The color image data of one line are composed of image data of one line of each color (red, green and blue). It is preferable that the 1-line reading positions for the respective colors are as adjacent to each other as possible. However, when the stepping motor for feeding the read-target original is stopped, some time delay occurs until the read-target original is stopped due to the inertial force of a feeding mechanism. The read-target original is unintentionally fed by some distance during this time delay. Accordingly, when a color reading apparatus is designed so that the reading operation is allowed to be temporarily interrupted at the end time when the reading operation of one line for any color (red, green and blue) is finished. As in the case of the above conventional color reading apparatus, the reading operation may be interrupted, for example, between the reading operation for the red color and the reading operation for the blue color. Thus, the reading position for the red color and the reading position for the blue color are greatly displaced from each other so that an accurate color image data cannot be obtained.

SUMMARY OF THE INVENTION

The present invention provides a color reading apparatus which can prevent the reduction in reading precision due to the interruption of the reading operation and a storage medium in which a program for controlling the color reading apparatus is stored.

According to a first aspect of the present invention, there is provided a color reading apparatus in which reflection light from a read-target medium is read on a line-by-line basis for each color of red, green and blue by a monochromatic line image sensor to perform a color reading operation while the relative position between the read-target medium and the monochromatic line image sensor is changed by a feeding apparatus. The color reading apparatus includes a feed control means for stopping a driving source of the feeding apparatus at the time of a 1-line color reading operation which is composed of 1-line reading operations for each of the red, green and blue colors (i.e., 1-line monochromatic reading operations of red, green and blue) in the case where the reading operation for a read-target medium is temporarily interrupted.

According to the above color reading apparatus, when the reading operation for a read-target medium is temporarily interrupted, the feeding control means stops the driving source of the feeding apparatus at the time when a set of 1-line monochromatic reading operations for each of the red, green and blue colors (i.e., the 1-line color reading operation) are completed. Therefore, the reduction in reading precision due to the interruption of the reading operation may be suppressed.

Since the reading operation is not interrupted halfway through the 1-line color reading operation for the red, green and blue colors, the respective 1-line monochromatic image data of the red, green and blue colors which constitute 1-line color image data are necessarily read out at respective reading positions which are mutually adjacent to one another. Thus, a high-precision reading operation an be maintained irrespective of the interruption of the reading operation.

The feeding apparatus may be designed to feed the read-target medium, such as a read-out original or the like, in the opposite direction to the auxiliary scan direction or to feed the light source and the monochromatic line image sensor in the auxiliary scan direction.

The monochromatic line image sensor may be a close contact type, non-contact type image sensor, a CCD image sensor, an MOS type image sensor or the like. The light source for irradiating light to the read-target medium may be light sources for red, green and blue colors, a white light source, or the like. When a white light source is used, three color filters may be inserted into the optical path between the white light source and the monochromatic line image sensor in turn to thereby read a read-target medium for each of the three colors read, green and blue. The order of the reading operations for red, green and blue colors may be arbitrarily set.

A stepping motor may be used as the driving source for the feeding apparatus, however, the driving source is not limited to a stepping motor. Other types of feeding apparatus may be used without departing from the spirit and scope of the present invention.

The feed control means may be implemented by a CPU which operates on the basis of a predetermined program, for example. The feed control means may also be implemented by a microcontroller and peripheral integrated circuit elements, an ASIC or other integrated circuit, a hardware electronic or logic circuit such as a discrete element circuit, a programmable logic device such as a PLD, PLA, FPGA or PAL, or the like.

According to a second aspect of the present invention, there is provided a color reading apparatus in which the color reading apparatus of the first aspect of the present invention is further provided with red, green and blue light emission diodes serving as an irradiation light source for irradiating light to a read-target medium. A turn-on control device for turning on each of the light emission diodes for a predetermined time in turn is also provided.

According to the above color reading apparatus of the second aspect of the present invention, in addition to the effect of the color reading apparatus of the first aspect, the color reading apparatus can be manufactured at a low price because light emission diodes are used as an irradiation light source. Also, the reading color can be readily and quickly switched to another reading color by use of the light emission diodes.

The number of the red, green and blue light emission diodes may be set to any value. Further, the respective red, green and blue light emission diodes may be packaged into one body. The turn-on control means may be implemented by a CPU operating on the basis of a predetermined program, a microcontroller and peripheral integrated circuit elements, an ASIC or other integrated circuit, a hardware electronic or logic circuit such as a discrete element circuit, a programmable logic device such as a PLD, PLA, FPGA or PAL, or the like.

According to a third aspect of the present invention, there is provided a storage medium for storing a program to read reflection light from a read-target medium on a line-by-line basis for each color of red, green and blue by a monochromatic line image sensor to perform a color reading operation. The program contains a feed control program for stopping a driving source of a feeding apparatus at the time when a set of 1-line monochromatic reading operations for red, green and blue colors are completed in the case where a reading operation of a read-target medium is temporarily interrupted.

According to the storage medium of the third aspect of the present invention, a CPU of a communication device is operated on the basis of the program thus stored. Thereby, the color reading apparatus of the present invention is implemented.

A ROM may be used as the storage medium. The present invention is not limited to the ROM, however, and an EEPROM, CD-ROM, hard disk, floppy disk, magnetic tape, and the like may be used.

BRIEF DESCRIPTION OF THE DRAWINGS

Preferred embodiments of the present invention will be described with reference to the accompanying drawings, wherein like numerals designate like elements, and wherein.

DETAILED DESCRIPTION OF PREFERRED EMBODIMENTS

Figure 1:
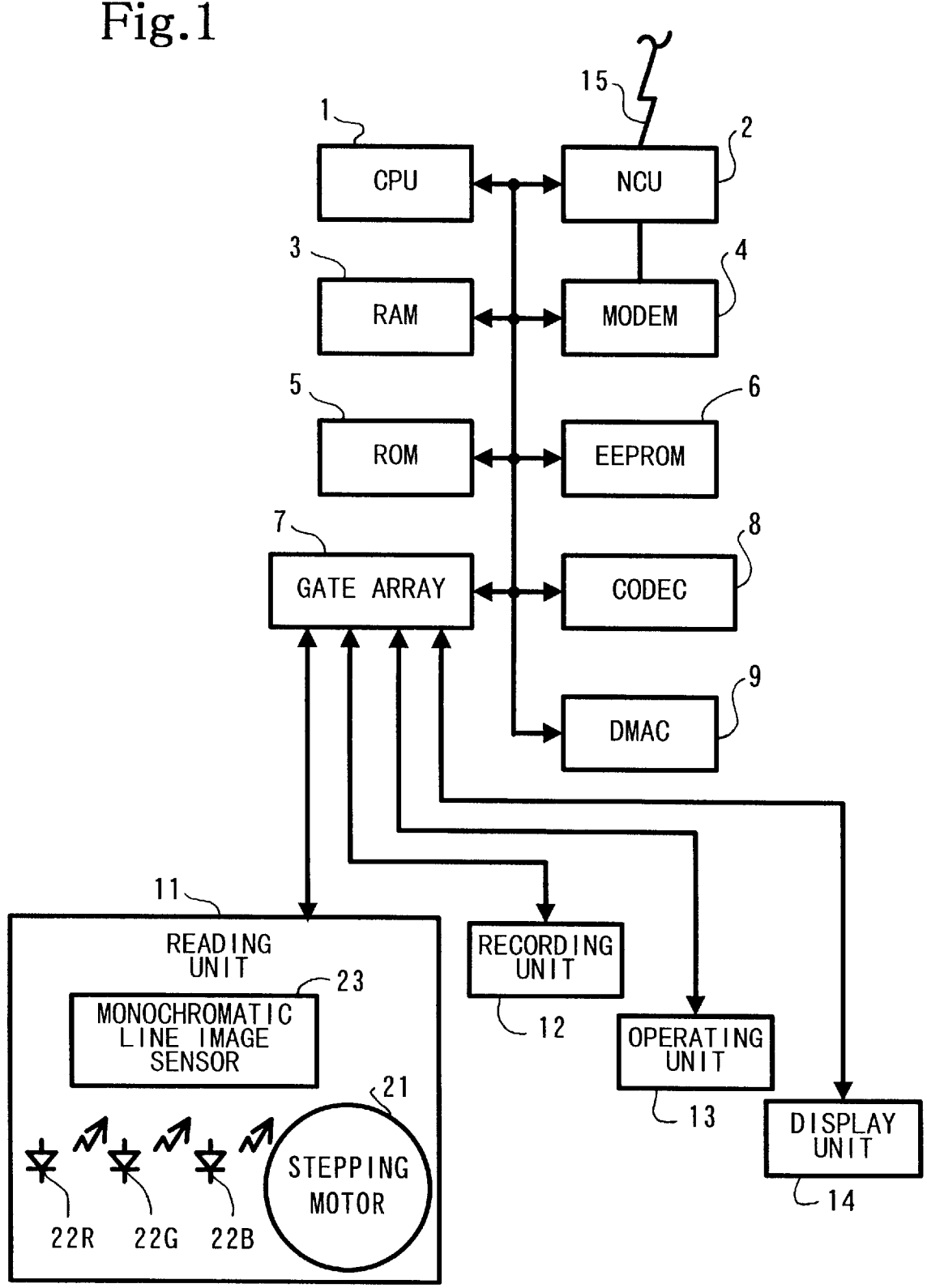
FIG. 1 is an exemplary circuit block diagram showing an image output machine having a color reading apparatus.

FIG. 1 is an exemplary circuit block diagram showing an image output machine having a color reading apparatus according to the present invention. The image output machine may be a facsimile machine, printer, scanner, personal computer, or the like.

The image output machine includes a central processing unit (CPU) 1, a network control unit (NCU) 2, a random access memory (RAM) 3, a modem 4, a read only memory (ROM) 5, an electrically eraseable and programmable read only memory (EEPROM) 6, a gate array 7, a coder/decoder (codec) 8, a direct memory access controller (DMAC) 9, a reading unit 11, a recording unit 12, an operating unit 13 and a display unit 14. The CPU 1, NCU 2, RAM 3, modem 4, ROM 5, EEPROM 6, gate array 7, codec 8 and DMAC 9 are mutually connected to one another through a bus line. The bus line contains an address bus, a data bus and a control signal line. The gate array 7 is connected to the reading unit 11, the recording unit 12, the operating unit 13 and the display unit 14. The NCU 2 is connected to a communication line 15 such as a telephone line, data line, wireless communication link, and the like. The reading unit 11 has a stepping motor 21, light emission diodes 22R, 22G, 22B and a monochromatic line image sensor 23.

The CPU 1 controls the overall facsimile machine. The NCU 2 is connected to the communication line 15 to perform network control. The RAM 3 supplies a work area for the CPU 1 and functions as a buffer memory for temporarily storing image data supplied from the reading unit 11 through the gate array 7 in a transmission operation or a copy operation. The modem 4 modulates transmission data and demodulates reception data. The ROM 5 stores various kinds of programs and initial set values. The EEPROM 6 stores various flags such as an initial value flag, etc.

The gate array 7 functions as an input/output interface of the CPU 1, and it serves to perform A/D conversion on an analog image signal from the reading unit 11 and also perform various processing on the image data. The codec 8 codes transmission image data and decodes reception image data. The DMAC 9 writes/reads image data into/from the RAM 3. The reading unit 11 reads an image on a read-target original and outputs analog image signals of red, green and blue.

The recording unit 12 may have an ink jet type, thermal transfer type, laser jet type, dot matrix type, or the like type print means and records a reception image or a read-out image on a recording sheet. The operation unit 13 enables a user to perform a mode switching operation, an operation-instructing operation and various setting operations or a registering operation. The operation unit 13 may include a key switch group that outputs a signal corresponding to a user's operation of the key switch group. The display unit 14 may include a liquid crystal display (LCD), cathode ray tube (CRT), flat screen display, touch screen display, or the like. The display unit 14 is controlled by the CPU 1 to perform various kinds of displays.

The stepping motor 21 of the reading unit 11 drives a line feed roller (not shown) for moving the read-target original in the opposite direction to an auxiliary scan direction. Each of the light emission diodes 22R, 22G, 22B of the respective red, green and blue colors irradiates the corresponding color light on the read-target original for a predetermined time in turn. The monochromatic line image sensor 23 may include a close-contact type line image sensor or the like, and outputs an analog read image signal corresponding to the amount of irradiation light reflected by the read-target original.

The CPU 1 may be operated on the basis of a program stored in the ROM 5, thereby implementing feed control for stopping a driving source for a feeding apparatus at the completion time of a set of 1-line monochromatic reading operations for red, green and blue colors when the reading operation of a read-target medium is temporarily interrupted. Further, the CPU 1 may also be operated on the basis of the program stored in the ROM 5, thereby implementing turn-on control for turning on each of the light emission diodes of the respective colors for a predetermined time in turn.

The ROM 5 is a storage medium in which a program for controlling the color reading apparatus is stored. According to the program stored in the ROM 5, the color reading apparatus performs such a color reading operation that the reflection light from the read-target original is read on a line-by-line basis for each of the red, green and blue colors by a monochromatic line image sensor while the relative position between the read-target medium and the monochromatic line image sensor is changed by the feeding apparatus. The program may contain a feed control program for stopping the driving source of the feeding apparatus at a time when a set of 1-line monochromatic reading operations for red, green and blue colors are completed (i.e., a 1-line color reading operation is completed) in the case where the reading operation of a read-target original is temporarily interrupted.

Next, the main operation of the image output machine will be described. When a reading operation of a read-target original, such as a facsimile transmission operation, a copy operation, or the like, is carried out, the CPU 1 controls the stepping motor 21 of the reading unit 11 through the gate array 7 to feed the read-target original at a predetermined speed in the direction opposite to an auxiliary scan direction. At the same time, the CPU 1 successively turns on each of the light emission diodes 22R, 22G and 22B for a predetermined time through the gate array 7. Here, when the light emission diodes 22R, 22G, 22B are assumed to be turned on in the order of red, green and blue, the red light is first emitted from the light emission diode 22R to irradiate the red light to the read-target original, the reflection light from the read-target original is incident to the monochromatic line image sensor 23, and the 1-line analog read-out image signal corresponding to the incident light amount is output from the monochromatic line image sensor 23.

Subsequently, the green light is emitted from the light emission diode 22G to irradiate the green light to the read-target original. The reflection light from the read-out original is incident to the monochromatic line image sensor 23. Then, the 1-line analog read-out image signal corresponding to the incident light amount is output by the monochromatic line image sensor 23.

Subsequently, the blue light is emitted from the light emission diode 22B to irradiate the blue light to the read-target original, the reflection light from the read-target original is incident to the monochromatic line image sensor 23, and then the 1-line analog read-out image signal corresponding to the incident light amount is output from the monochromatic line image sensor 23. The 1-line read-out image signals of red, green and blue colors which are successively output from the monochromatic line image sensor 23 are subjected to A/D conversion by the gate array 7, subjected to various image processing as a set of 1-line monochromatic image read-out data (i.e., 1-line color image read-out data), and then stored into the RAM 3 as a buffer memory by the DMAC 9.

Thereafter, the CPU 1 judges whether the empty capacity of the RAM 3 is above a predetermined value or not. If the empty capacity is judged to be above the predetermined value, the reading operation is continued to achieve a next 1-line color image read-out data (i.e., a next set of 1-line monochromatic image read-out data). If the empty capacity is judged not to be above the predetermined value, the CPU 1 stops the driving of the stepping motor 21, and the processing waits until the empty capacity of the RAM 3 is equal to the predetermined value or more. That is, the reading operation is interrupted until the empty capacity of the RAM 3 is equal to such a capacity that 1-line color read-out image data (i.e., a set of 1-line monochromatic read-out image data of red, green and blue colors) can be stored.

When the reading operation is interrupted, the read-target original is fed by a distance due to the inertial force of the feeding mechanism even when the driving of the stepping motor 21 is stopped. However, the reading operation of the original is interrupted at the time when the reading operation of a set of 1-line monochromatic read-out image data of red, green and blue colors is completed. Thus, the 1-line reading positions for the red, green and blue colors which are handled as the same line are prevented from being greatly displaced from one another so that high-precision reading operations can be performed.

Figure 2:
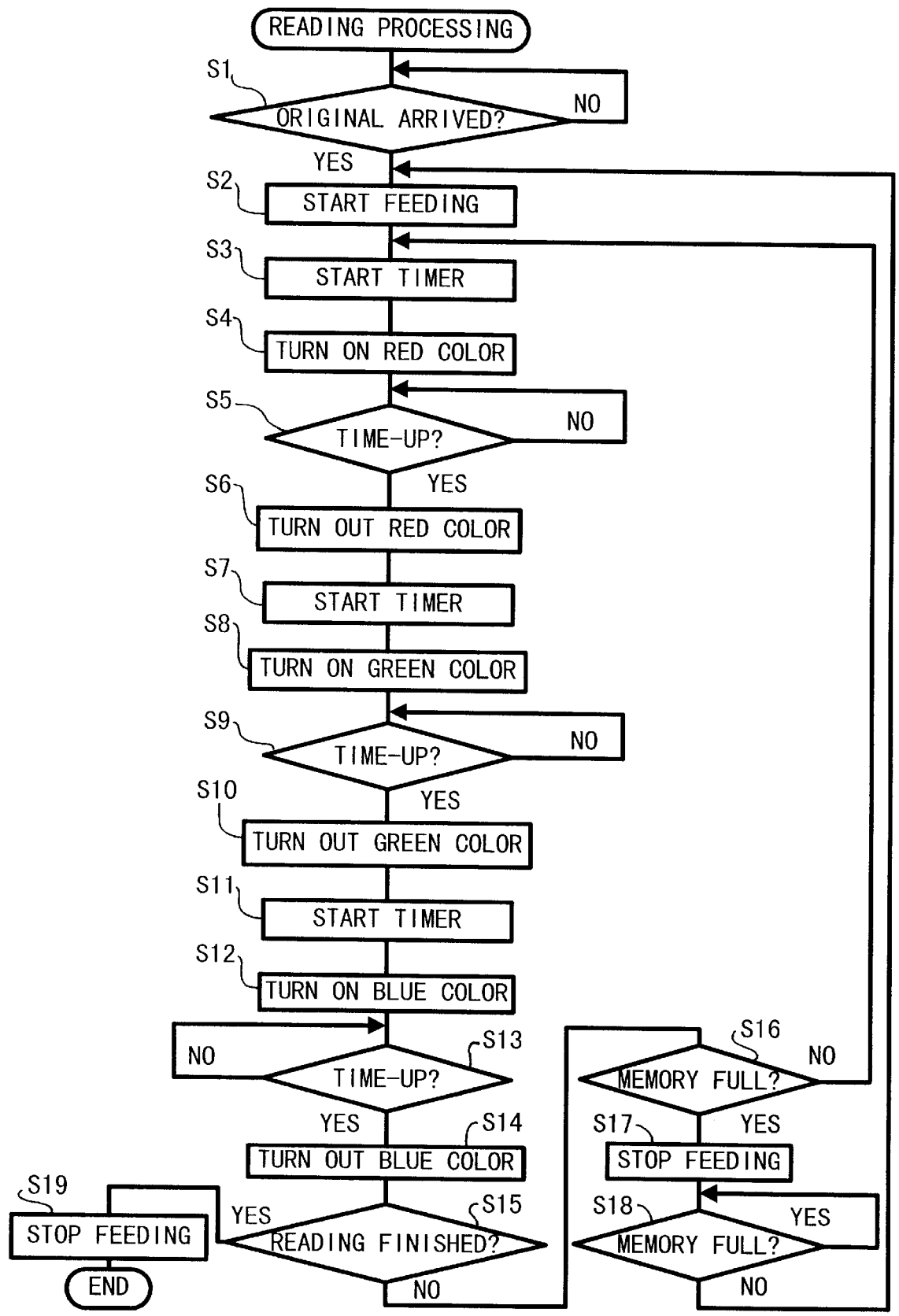
FIG. 2 is an exemplary flowchart outlining a reading procedure of the image output machine shown in FIG. 1.

Next, a reading procedure of the above reading operation will be described with reference to the exemplary flowchart of FIG. 2.

First, in step S1, the CPU 1 judges whether the read-target original arrives.

Specifically, the CPU 1 checks, on the basis of the detection signal from a sensor for the original (not shown), whether the start edge of the read-target original fed by the feeding apparatus (not shown) arrives at a predetermined reading position.

If the read-target original is judged to arrive at the predetermined position (S1: YES), the CPU 1, in step S2, starts the feeding operation for the reading. Specifically, the CPU 1 controls the stepping motor of the reading unit 11 to feed the read-target original at a fixed speed which is suitable to the reading operation of the monochromatic line image sensor 23. If the read-target original is judged not to arrive in S1 (S1:NO), the processing returns to step S1 to wait until the read-target original arrives.

In step S3, the CPU 1 starts a timer that is used to determine an irradiation time of the red light to the read-target original. The irradiation time is set to be long enough to accumulate a suitable amount of charges by the monochromatic line image sensor 23. The timer is implemented by a down-counter (not shown) which performs a count operation in synchronism with a clock signal and whose initial value is set by the CPU 1. The timer can vary the count time in accordance with the initial value thus set.

Thereafter, in step S4, the CPU 1 turns on the red light emission diode 22R of the reading unit 11, whereby the read-target original is exposed to the red light and the reflection light from the read-target original is incident to the monochromatic line image sensor 23. In step S5, the CPU 1 judges whether the time set in the timer started in step S3 is up. If the time set in the timer is judged to be up (S5: YES), the CPU 1, in step S6, turns out the red light emission diode 22R of the reading unit 11. If the time set in the timer is not up in step S5 (S5:NO), the processing returns to step S5 to wait until the time set in the timer is up.

The CPU 1 then, in step S7, starts another timer that is used to determine an irradiation time of the green light to the read-target original. The count time of the timer may be set to be the same as or different from that of the timer started in step S3. In step S8, the CPU 1 turns on the green light emission diode 22G of the reading unit 11. Thereafter, the CPU 1 judges, in step S9, whether the time set in the timer started in S7 is up. If the time set in the timer is up (S9:YES), the CPU 1, in step S10, turns out the green light emission diode 22G of the reading unit 11. If the time set in the timer is not up in step S9 (S9:NO), the processing returns to step S9 to wait until the time set in the timer is up.

The CPU 1, in step S11, starts a third timer that is used to determine the irradiation time of the blue light to the read-target original. The irradiation time is set to be the same as or different from that of the timer started in S3 or S7. The CPU 1, in step S12, turns on the blue light emission diode 22B of the reading unit 11. In step S13, the CPU 1 judges whether the time set in the timer started in S11 is up. If the time set in the timer is up (S13: YES), the CPU 1, in step S14, turns out the blue light emission diode 22B of the reading unit 11. The CPU 1, in step S15, judges whether the reading operation is completed or not. Specifically, the CPU 1 checks on the basis of the detection signal from a sensor for the original whether the end edge of the read-target original arrives at a predetermined position. If the time set in the timer is not up in step S13 (S13:NO), the processing returns to step S13 to wait until the time set in the timer is up.

If the reading operation is judged not to be completed (S15:NO), the CPU 1, in step S16, judges whether the memory is full or not. Specifically, the CPU 1 checks whether the empty capacity of the RAM 3 is below a predetermined value. This predetermined value is set to be large enough to store a set of 1-line monochromatic image data of red, green and blue colors (constituting 1-line color image data). If the reading operation is finished in step S15 (S15:YES), the CPU 1, in step S19, stops the feeding operation for the reading operation and finishes the reading operation. The read-target original for which the reading operation has been completed is discharged to the outside of the image output machine by the feeding apparatus (not shown).

If the capacity of the memory is full (S16: YES), the CPU 1, in step S17, stops the feeding operation of the read-target original. Specifically, the CPU 1 stops the driving of the stepping motor 21 of the reading unit 11 to intercept the feeding operation of the read-target original for the reading operation. If the memory is judged not to be full in step S16 (S16:NO), the processing returns to step S3 to continue the reading operation.

In step S18, the CPU 1 judges whether the memory is full or not. If the memory is not full (S18: NO), the processing of the CPU 1 returns to S2 to re-start the feeding operation of the read-target original to perform the reading operation. That is, since the empty capacity of the RAM 3 is increased in the progress of the processing of the color image data by the modem 4 or the recording unit 12, the recording operation is restarted if the empty capacity becomes large enough to store a set of 1-line monochromatic image data of red, green and blue colors (constituting 1-line color image data).

As described above, according to the color reading apparatus of the first aspect of the present invention, when the reading operation of a read-target medium is temporarily interrupted, the feed control means stops the driving source for the feeding apparatus at the time when a set of 1-line monochromatic reading operations for red, green and blue colors are completed. Therefore, the reduction in reading precision due to the interruption of the reading operation can be prevented.

According to the color reading apparatus of the second aspect of the present invention, light emission diodes are used as the irradiation light source. Accordingly, in addition to the effect of the color reading apparatus of the first aspect of the present invention, the apparatus can be manufactured at low cost and the reading color can be switched readily and quickly.

Further, according to the storage medium of the third aspect of the present invention, the CPU of the image output apparatus may be operated on the basis of the program stored in a storage medium.

As shown in FIG. 1, the method of this invention is preferably implemented on a programmed processor. However, the color reading apparatus can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIG. 2 can be used to implement the color reading apparatus functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A color reading apparatus, comprising:
   a light source that irradiates light on a read-target medium, the irradiated light including a plurality of light colors emitted from a red light emission diode, a green light emission diode and a blue light emission diode;
   a line image sensor that performs a line-by-line color reading operation based on light irradiated by the light source;
   a feeding apparatus that changes a relative position between the read-target medium and the line image sensor;
   a feed controller for stopping the feeding apparatus at a completion time of a color reading operation when the color reading operation is temporarily interrupted, the color reading operation being composed of one-line reading operations for each of the plurality of light colors; and
   a turn-on controller for turning on each of the red, green and blue light emission diodes for a predetermined time in turn.

2. The color reading apparatus of claim 1, wherein the line image sensor is a monochromatic line image sensor.

3. The color reading apparatus of claim 2, wherein the monochromatic line image sensor is of a close-contact type or a non-contact type.

4. The color reading apparatus of claim 1, wherein the line image sensor includes at least one of a CCD image sensor and a MOS type image sensor.

5. The color reading apparatus of claim 1, wherein the feeding apparatus includes a stepping motor and a driving source.

6. The color reading apparatus of claim 1, wherein the red, green and blue light emission diodes are packaged into a single body.

7. The color reading apparatus of claim 1, wherein the color reading apparatus is one of a facsimile machine, a printer or a scanner.

8. The color reading apparatus of claim 1, wherein the feeding apparatus feeds the read-target medium at a predetermined speed in a direction opposite an auxiliary scan direction.

9. The color reading apparatus of claim 1, wherein the feed controller judges whether a free capacity of a storage device falls below a predetermined amount and if the free capacity is below the predetermined amount, the feed controller stops the feeding apparatus.

10. A storage medium that stores machine readable instructions for use with a computer, the storage medium comprising:

first instructions that instruct a light source to irradiate light onto a read-target medium, the irradiated light including a plurality of light colors;

second instructions that instruct a line image sensor to perform a line-by-line color reading operation based on light irradiated by the light source; and third instructions that instruct a feeding apparatus to stop a feeding operation at a completion time of a color reading operation when the color reading operation is temporarily interrupted, the color reading operation being composed of one-line reading operations for each of the plurality of light colors, wherein the first instructions include instructions for turning on a red light emission diode, a green light emission diode and a blue emission diode for a predetermined time, in turn.

11. The storage medium of claim 10, wherein the third instructions include instructions for judging whether a free capacity of a storage device falls below a predetermined amount and if the free capacity is below the predetermined amount, the feeding apparatus is stopped.

12. A color reading method, comprising:

feeding a read-target medium;

irradiating light on a read-target medium, the irradiated light including a plurality of light colors;

performing a line-by-line color reading operation based on light irradiated by the light source; and stopping the feeding of the read-target medium at a completion time of a color reading operation when the color reading operation is temporarily interrupted, the color reading operation being composed of one-line reading operations for each of the plurality of light colors, wherein irradiating light on a read-target medium further comprises:

turning on a red light emission diode;

turning on a green light emission diode; and turning on a blue light emission diode, in turn, for a predetermined time.

13. The method of claim 12, wherein feeding the read-target medium further comprises feeding the read-target medium at a predetermined speed in a direction opposite an auxiliary scan direction.

14. The method of claim 12, wherein stopping the feeding of the read-target medium further comprises:

judging whether a free capacity of a storage device falls below a predetermined amount; and stopping the feeding of the read-target medium if the free capacity is below the predetermined amount.

15. A method of making a color reading apparatus, comprising:

providing a light source that irradiates light on a read-target medium, the irradiated light including a plurality of light colors emitted from a red light emission diode, a green light emission diode and a blue light emission diode;

providing a line image sensor that performs a line-by-line color reading operation based on light irradiated by the light source;

providing a feeding apparatus that changes a relative position between the read-target medium and the line image sensor;

providing a feed controller for stopping the feeding apparatus at a completion time of a color reading operation when the color reading operation is temporarily interrupted, the color reading operation being composed of one-line reading operations for each of the plurality of light colors; and providing a turn-on controller for turning on each of the red, green and blue light emission diodes for a predetermined time in turn.

* * * * *